United States Patent
Lopes Pereira et al.

(10) Patent No.: US 11,668,162 B2
(45) Date of Patent: Jun. 6, 2023

(54) PREDICTING DOWNHOLE MECHANICAL CLEANING EFFICIENCY IN WELLBORE WALLS DURING WELLBORE FLUIDS DISPLACEMENTS

(71) Applicant: Halliburton Energy Services, Inc., Houston, TX (US)

(72) Inventors: Vitor Lopes Pereira, The Woodlands, TX (US); Dale E. Jamison, Humble, TX (US)

(73) Assignee: Halliburton Energy Services, Inc., Houston, TX (US)

(*) Notice: Subject to any disclaimer, the term of this patent is extended or adjusted under 35 U.S.C. 154(b) by 481 days.

(21) Appl. No.: 16/616,296

(22) PCT Filed: Dec. 31, 2018

(86) PCT No.: PCT/US2018/068166
§ 371 (c)(1),
(2) Date: Nov. 22, 2019

(87) PCT Pub. No.: WO2020/142075
PCT Pub. Date: Jul. 9, 2020

(65) Prior Publication Data
US 2021/0123324 A1    Apr. 29, 2021

(51) Int. Cl.
*G06F 30/28* (2020.01)
*E21B 37/06* (2006.01)
(Continued)

(52) U.S. Cl.
CPC .............. *E21B 37/06* (2013.01); *E21B 37/00* (2013.01); *E21B 47/006* (2020.05);
(Continued)

(58) Field of Classification Search
CPC ........ E21B 37/06; E21B 37/00; E21B 47/006; E21B 47/007; E21B 2200/20;
(Continued)

(56) References Cited

U.S. PATENT DOCUMENTS

| | | | |
|---|---|---|---|
| 5,339,899 A | * | 8/1994 | Ravi .................. E21B 37/00 166/250 |
| 9,416,631 B2 | | 8/2016 | Wu et al. |

(Continued)

FOREIGN PATENT DOCUMENTS

| | | | |
|---|---|---|---|
| CA | 2120585 A1 | * 5/1993 | .......... E21B 49/005 |
| CA | 2919059 A1 | 3/2015 | |

(Continued)

OTHER PUBLICATIONS

Ermila, M. A. (2012). Magneto-rheological cementing tool for improving hydraulic isolation in unconventional wells (Order No. 10797392). (Year: 2012).*

(Continued)

*Primary Examiner* — Andre Pierre Louis
(74) *Attorney, Agent, or Firm* — Michael Jenney; Parker Justiss, P.C.

(57) ABSTRACT

Predicting the efficiency of downhole mechanical removal of one or more accreted materials from one or more wellbore walls may prevent the unnecessary consumption of resources in a wellbore fluids displacement operation. A method and system for removing accreted materials in a wellbore is provided, wherein the efficiency of mechanical removal of accreted materials may be characterized based, at least in part, on a comparison between one or more actual shear stresses exerted by a wellbore servicing fluid at one or more depths of the wellbore and one or more required shear stresses to remove the accreted materials from the depth. The one or more required shear stresses may be determined (Continued)

using one or more of one or more known properties of the one or more accreted materials, one or more rheology models, one or more hydraulic parameters, one or more wellbore hydraulic models, and one or more downhole conditions. To account for one or more effects of eccentricity in the wellbore, the one or more actual shear stresses exerted by wellbore servicing fluid may be determined by partitioning one or more three dimensional flow profiles into divided annular segments for individual analysis. To improve operational decision making, operators or automated processes may modify the wellbore fluids displacement operation based, at least in part, on the comparison. The comparison between the one or more actual shear stresses and the one or more required shear stresses may be used to generate a parameter that characterizes the cleaning efficiency of the wellbore fluids displacement operation.

20 Claims, 6 Drawing Sheets

(51) Int. Cl.
| | | |
|---|---|---|
| *E21B 47/007* | (2012.01) | |
| *E21B 47/00* | (2012.01) | |
| *E21B 37/00* | (2006.01) | |
| *F04B 49/06* | (2006.01) | |
| *G06F 111/10* | (2020.01) | |

(52) U.S. Cl.
CPC .......... *E21B 47/007* (2020.05); *F04B 49/065* (2013.01); *G06F 30/28* (2020.01); *E21B 2200/20* (2020.05); *G06F 2111/10* (2020.01)

(58) Field of Classification Search
CPC .......... E21B 21/06; E21B 41/00; E21B 49/00; E21B 33/00; F04B 49/065; G06F 30/28; G06F 2111/10; G06F 30/20
See application file for complete search history.

(56) References Cited

U.S. PATENT DOCUMENTS

| | | | |
|---|---|---|---|
| 10,605,060 B2* | 3/2020 | Chuprakov | ............. E21B 47/00 703/10 |
| 2010/0076738 A1 | 3/2010 | Dean et al. | |
| 2012/0118638 A1 | 5/2012 | Orbell et al. | |
| 2013/0146357 A1 | 6/2013 | Lovorn | |
| 2014/0299315 A1 | 10/2014 | Chuprakov et al. | |
| 2015/0066457 A1 | 3/2015 | Wu et al. | |

FOREIGN PATENT DOCUMENTS

| | | |
|---|---|---|
| GB | 2335687 A | 9/1999 |
| GB | 2524788 A | 10/2015 |
| RU | 2386783 C2 | 4/2010 |
| WO | 00/73620 A1 | 12/2000 |
| WO | 01/90528 A1 | 11/2001 |
| WO | 2015/030863 A1 | 3/2015 |
| WO | 2017/192635 A1 | 11/2017 |
| WO | WO 2019195923 A1 * | 4/2018 |
| WO | WO 2019199312 A1 * | 4/2018 |

OTHER PUBLICATIONS

Ravi, K.M., Beirute, R.M., and R.L. Covington. "Erodability of Partially Dehydrated Gelled Drilling Fluid and Filter Cake." Paper presented at the SPE Annual Technical Conference and Exhibition, Washington, D.C., Oct. 1992. doi: https://doi.org/10.2118/24571-MS (Year: 1992).*

Philippe M.J. Tardy, A 3D model for annular displacements of wellbore completion fluids with casing movement, Journal of Petroleum Science and Engineering, vol. 162, 2018, pp. 114-136, ISSN 0920-4105, https://doi.org/10.1016/j.petrol.2017.11.071. (Year: 2017).*

International Preliminary Report on Patentability issued in related PCT Application No. PCT/US2018/068166 dated Jul. 15, 2021, 6 pages.

International Search Report issued in related PCT Application No. PCT/US2018/068166 dated Sep. 26, 2019, 10 pages.

Ekambara, Kalekudithi, and J. B. Joshi. "Axial mixing in pipe flows: turbulent and transition regions." Chemical Engineering Science 58.12 (2003): 2715-2724.

Gibson Applied Technology and Engineering, Inc., "Axial Mixing in Pipe Displacement", Jul. 2012, 2 pages.

Sutherland, B. R., et al. "Interfacial Mixing in Viscous Pipe Flows Final report to Imperial Oil." (2000).

Enayatpour, Saeid, and Eric van Oort. "Advanced modeling of cement displacement complexities." SPE/IADC Drilling Conference and Exhibition. Society of Petroleum Engineers, 2017.

Jakobsen, J., et al. "Displacements in eccentric annuli during primary cementing in deviated wells." SPE Production Operations Symposium. Society of Petroleum Engineers, 1991.

Beirute, R. M., F. L. Sabins, and K. V. Ravi. "Large-scale experiments show proper hole conditioning: A critical requirement for successful cementing operations." SPE Annual Technical Conference and Exhibition. Society of Petroleum Engineers, 1991.

Smith, T. R., and K. M. Ravi. "Investigation of drilling fluid properties to maximize cement displacement efficiency." SPE Annual Technical Conference and Exhibition. Society of Petroleum Engineers, 1991.

Ravi, K. M., R. M. Beirute, and R. L. Covington. "Erodability of partially dehydrated gelled drilling fluid and filter cake." SPE Annual Technical Conference and Exhibition. Society of Petroleum Engineers, 1992.

Vefring, E. H., et al. "Optimization of displacement efficiency during primary cementing." Latin American and Caribbean Petroleum Engineering Conference. Society of Petroleum Engineers, 1997.

Biezen, Ewout, Niels van der Werff, and Kris Ravi. "Experimental and numerical study of drilling fluid removal from a horizontal wellbore." SPE annual technical conference and exhibition. Society of Petroleum Engineers, 2000.

Hemphill, T., and K. Ravi. "Pipe Rotation and Hole Cleaning in an Eccentric Annulus." IADC/SPE Drilling Conference. 2006.

Gorokhova, Lidia, Andrew J. Parry, and Nicolas C. Flamant. "Comparing soft-string and stiff-string methods used to compute casing centralization." SPE Drilling & Completion 29.01 (2014): 106-114.

Karbasforoushan, Hanieh, et al. "On the Instability of Cement-Fluid Interface and Fluid Mixing." SPE Deepwater Drilling and Completions Conference. Society of Petroleum Engineers, 2016.

Leach, S.J. "Stratification and Mixing of Fluids of Different Densities," 1968, 9 pages.

Alba, K., S. M. Taghavi, and I. A. Frigaard. "Miscible density-stable displacement flows in inclined tube." Physics of Fluids 24.12 (2012): 123102.

Liao, Jue. "Rayleigh-Taylor growth rate for arbitrary density profiles calculated with a variational method." Laboratory for Laser Energetics Summer High School Project Report (2002).

* cited by examiner

PREDICTING DOWNHOLE MECHANICAL CLEANING EFFICIENCY IN WELLBORE WALLS DURING WELLBORE FLUIDS DISPLACEMENTS

CROSS-REFERENCE TO RELATED APPLICATION

The present application is a U.S. National Stage Application of International Application No. PCT/US2018/068166 filed Dec. 31, 2018, which is incorporated herein by reference in its entirety for all purposes.

TECHNICAL FIELD

The present invention relates to methods for predicting the mechanical removal of residual oils and solids in a wellbore, and, more particularly, to systems and methods for assessing the cleaning efficiency of gelled fluids and accreted materials in wellbore fluids displacements.

BACKGROUND

As used herein, the term "gelled fluid" refers to fluid that forms a network of bonds (for example, a gel microstructure) under either static or dynamic conditions. The strength of a gelled fluid relates, in part, to the corresponding gel microstructure, which is related to, inter alia, the intermolecular forces between the gelling agents (for example, hydrogen bonding between polysaccharide molecules). However, the intermolecular forces can be relatively weak (for example, as compared to ionic and covalent bonds). These relatively weak bonds may break when energy is put into the gel (for example, by flowing or mixing the gel) and can reform over time as the energy input reduces or ceases. Therefore, a single gelled fluid may have a varying strength based on the history (for example, the shear history) of the gelled fluid.

In a well system environment, residual oil, fluids, and solids left in a wellbore by drilling and completion operations may detrimentally affect the performance of subsequent operations. A wellbore fluids displacement is an operation used to remove solids and debris and displace existing fluids in the wellbore. Failure to perform an effective wellbore fluids displacement may create unnecessary burdens for logistics and rig resources, for example, by hindering completion operations and damaging the wellbore.

Wellbore fluids displacements remove unwanted fluid deposits through both mechanical and chemical means of cleaning. Mechanical cleaning of residue is required, for instance, when accreted materials, such as gelled fluids, adhere to the walls of a wellbore during various operations. By circulating a fluid through the wellbore at a sufficient flow rate to create adequate shear on the wellbore walls, gelled fluids may be removed by erosion. Because numerous factors may result in leftover residue in the wellbore, such as the shear history of the gelled fluid or the flow rate of the displacement fluid, assessing the efficiency of downhole mechanical cleaning is critical to the design of a wellbore fluids displacement operation.

Although downhole mechanical cleaning may be quantified by sampling conditions of the wellbore at various downhole locations, predictions based on physics-based modeling are preferable because models more adequately inform the design of a displacement operation. Accurate modeling of a well system environment requires attention to numerous parameters, such as non-Newtonian flow, wellbore geometry (pipe eccentricity, diameters, hole trajectory), thermal gradients, wellbore lithology and stress state, downhole fluid properties (such as density and rheology), downhole properties of fluid deposits, pump rates, fluids sequence and pipe rotation effects. Existing methods are often imprecise because they evaluate properties at surface conditions independent of downhole conditions and the gelled fluid's history. Therefore, new methods and tools are needed to provide accurate predictions for the efficiency of cleaning.

Figure 1:
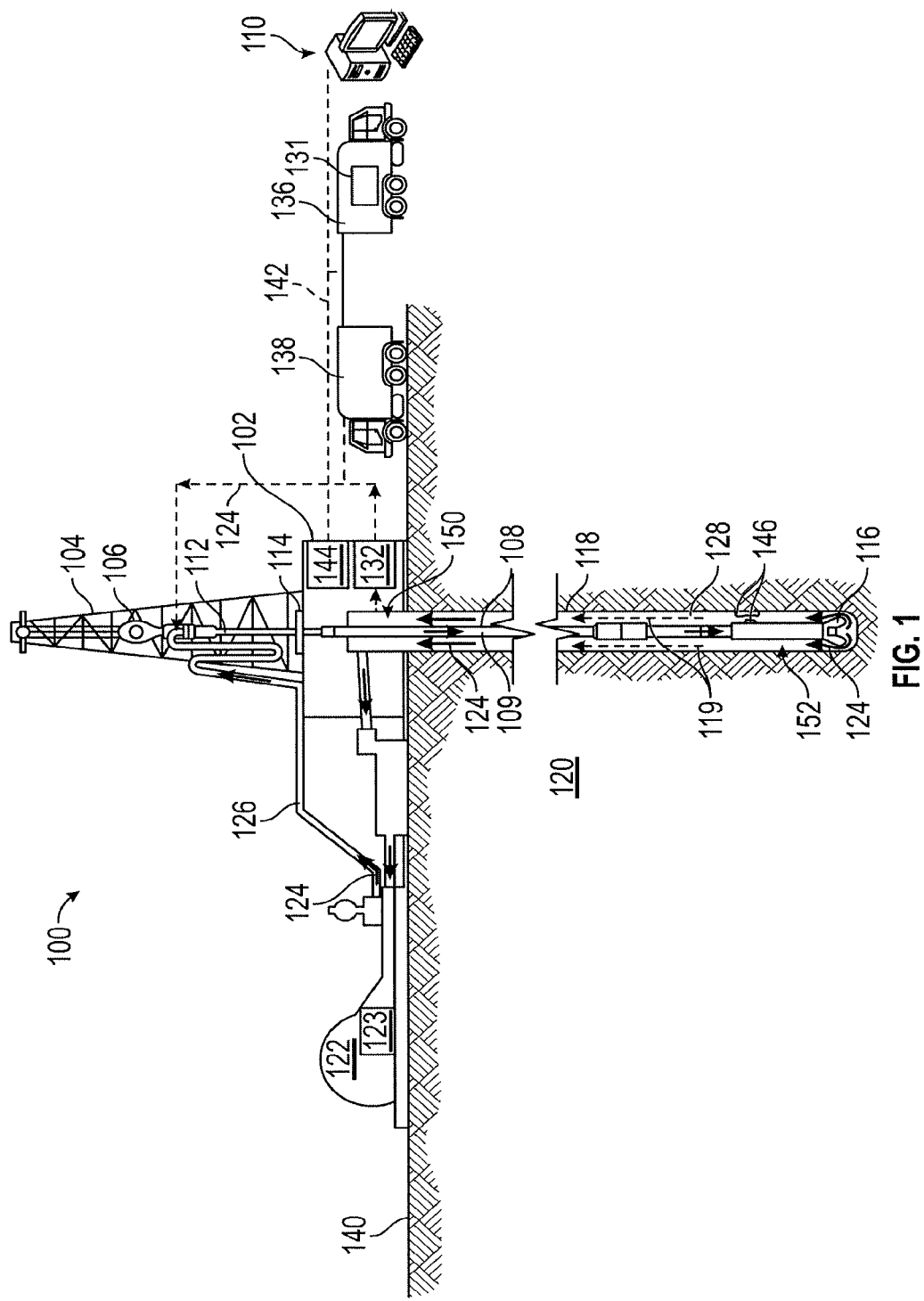
FIG. 1 is a schematic diagram of a wellbore servicing system, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present invention relates generally to operations performed and equipment utilized in conjunction with a subterranean wellbore and, in one or more embodiments described herein, more particularly provides a method and system for predicting the amount of gelled fluid removed from wellbore walls during a wellbore fluids displacement operation. The disclosure provides improved accuracy over existing methods by considering a gelled fluid's history at distinct wellbore depths and the gelled fluid's static time elapsed under the effect of local downhole conditions.

Residual unwanted substances from wellbore operations may create operational challenges, such as damage to the wellbore. The following disclosure describes one or more embodiments for assessing the mechanical cleaning efficiency of one or more gelled fluids from one or more wellbore walls during a wellbore fluids displacement.

Wellbore fluids displacement is defined as an operation used to clean a wellbore and displace one or more drilling fluids. A wellbore fluids displacement operation is hereafter referred to as a "displacement operation." A displacement operation is considered successful if the one or more initial fluids and one or more solids are no longer present or detectable in the wellbore (or desired portions of the wellbore) at the end of the displacement operation. Proper removal of one or more residual oils, one or more solids or both is vital to the longevity of a wellbore because residue may hinder completion operations and damage a producing subterranean formation. A displacement operation is performed using a series of one or more wellbore servicing fluids, namely "pills," "spacers," or both, which provide both chemical and mechanical cleaning. One or more pills, one or more spacers or both with one or more individual functions are circulated through the wellbore in a sequence known as a displacement train.

A displacement operation is constrained by various factors, including, but not limited to, environmental regulations, operational restrictions, and the risk of wellbore damage. Therefore, planning, designing, and executing a displacement operation requires rigorous adherence to detailed steps and best practices in order to achieve thorough cleaning efficiency. Design selection and operation modeling for displacement operations require detailed consideration of data of fluids involved in the displacement process. One or more suitable cleaning additives, as well as properties associated with the one or more suitable cleaning additives, one or more concentrations, one or more volumes, one or more flow rates and one or more pipe rotations (which are used to generate a sufficient fluid shear stress on the wellbore) are determined by one or more factors. The one or more factors may comprise one or more initial fluid types, one or more final fluid types, one or more initial fluid properties, one or more final fluid properties, one or more fluid losses to formation, a downhole pressure, a downhole temperature, differential pressure into the formation, one or more shutdown periods, a drilling history, a wellbore geometry, one or more rig capabilities, one or more downhole properties of one or more fluid deposits, and any combination thereof.

Poor design of a displacement operation may create unnecessary burdens for logistics and rig resources. For example, additional displacement operations may be required to rectify a poorly executed displacement operation. During the planning phase of a displacement operation, a volume, one or more properties, a chemistry, a concentration, and a flow regime of one or more fluids are carefully designed to consider the individual role of each pill, spacer or both in the displacement operation. Any one or more of a mechanical component, a chemical component, and a hydraulic component play a vital role in the displacement operation. Optimal design maximizes the cleaning efficiency of a displacement operation, which requires attention to mechanical removal of cuttings, as well as both the chemical and mechanical removal of one or more gelled fluids. Designers may also modify a volume, one or more properties, a chemistry, a concentration, a flow regime, and combination thereof of a fluid to accommodate the individual purpose of each pill, each spacer, or both.

One notable challenge for displacement operations is the mechanical removal of, one or more accreted materials. Accreted materials, for the purposes of this disclosure, comprises any one or more substances that adhere to the walls of a wellbore during one or more operations associated with the wellbore, for example, one or more hydrocarbon exploration, production, recovery and completion operations. Accreted materials may comprise one or more gelled fluids, one or more sediment deposits, one or more solids, other materials that adhere to the walls of a wellbore, and a combination thereof. For instance, removal of a gelled fluid is challenging to predict because a gelled fluid possesses unique one or more time dependent properties, which may change at downhole wellbore conditions. Most notably for the purposes of this disclosure, a gelled fluid develops gel strength during static time under the influence of annular hydrostatic pressure in the absence of shear. Static time refers to periods of time during wellbore operations when fluid does not circulate through the wellbore, thereby allowing the buildup of gel strength. Due to the complexity of behavior for a gelled fluid, effective displacement of a gelled fluid requires particular attention to numerous parameters, such as a eccentricity of a wellbore, one or more non-Newtonian flows, a wellbore geometry, a thermal gradient of the wellbore, a wellbore lithology, one or more downhole fluid properties, one or more downhole properties of fluid deposits, one or more downhole spacer fluid properties, one or more pump schedules, and one or more pipe rotation effects.

Generally, a fluid is considered a gelled fluid for this description when the fluid exhibits the characteristics of a thixotropic fluid, which is a fluid with a time dependent stress response for one or more shear rates, a fluid that exhibits a time dependent stress when a shear is initiated, a fluid that experiences a decrease in shear rate over time when a shear is initiated and the shear is continued at a specific shear rate, a fluid that returns to a higher stress state over a fixed time when a shear force is stopped, or a fluid that exhibits more than one of these characteristics. A gelled fluid described herein may be or comprise treatment fluid, drilling fluid, drill-in fluid, insulating fluid, lost circulation fluid, stimulation fluids, sand control fluid, completion fluid, acidizing fluid, scale inhibiting fluid, water-blocking fluid, clay stabilizer fluid, fracturing fluid, frac-packing fluid, gravel packing fluid, wellbore strengthening fluid, sag control fluid, one or more coal slurries, colloidal fluid, particle suspension fluid, cement, one or more adhesives, paint, one or more waste streams (for example, tailings suspension), and the like, or any hybrid thereof.

To facilitate a better understanding of the present invention, the following examples of certain embodiments are given. In no way should the following examples be read to limit, or define, the scope of the invention. Although the following disclosure concentrates on the removal of gelled fluids, the methods and tools can be extended for the removal of other accreted materials that adhere to wellbore walls in drilling operations. One or more embodiments of the present disclosure may be applicable to any type of drilling operation including, but not limited to, exploration, services or production operation for any type of well site or reservoir environment including subsurface and subsea environments.

According to one or more aspects of the present disclosure, an information handling system or computer equipment may be required. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

FIG. 1 illustrates a wellbore servicing system 100 and wellbore monitoring system 110 that may employ one or more of methods described herein in order to determine a mechanical cleaning efficiency or identify one or more characteristics of the wellbore, according to one or more embodiments. The example wellbore servicing system 100 comprises a drilling platform 102 that supports a derrick 104 having a traveling block 106 for raising and lowering a drill string 108. A kelly 112 supports the drill string 108 as it is lowered through a rotary table 114. A drill bit 116 is attached to the distal end of the drill string 108 and is driven either by a downhole motor and/or via rotation of the drill string 108 from the well surface. As the bit 116 rotates, it creates a wellbore 118 that penetrates various subterranean formations 120. The example wellbore 118 shown in FIG. 1 comprises a vertical wellbore. However, a wellbore servicing system 100 may comprise any combination of horizontal, vertical, slant, curved, or other wellbore orientations.

A pump 122 (for example, a mud pump) circulates wellbore servicing fluid 124 through a feed pipe 126 and to the kelly 112, which conveys the wellbore servicing fluid 124 downhole through an interior conduit 109 defined in the drill string 108 and through one or more orifices in the drill bit 116. The wellbore servicing fluid 124 is then circulated back to the surface via an annulus 128 defined between the drill string 108 and the walls of the wellbore 118. The route through which wellbore servicing fluid 124 circulates may be described using one or more fluid flow paths 119. In one or more embodiments, operation of wellbore servicing system 100 may comprise diverting wellbore servicing fluid 124 to fluid reclamation equipment 132 and optimizing associated fluid reclamation equipment 132.

The wellbore servicing fluid 124 may carry out several functions, such as the mechanical and chemical removal of one or more fluid deposits from wellbore walls, and the mechanical removal of cuttings and solids. The wellbore servicing fluid 124 may be any wellbore clean-up or completion fluid known to those skilled in the art. In one or more embodiments, for example, the wellbore servicing fluid 124 may be water, such as a brine or the like, or one or more spacer fluids known to those skilled in the art. The wellbore servicing fluid 124 may comprise, but is not limited to, municipal treated or fresh water, sea water, salt water (for example, water containing one or more salts dissolved therein) naturally-occurring brine, a chloride-based, bromide-based, or formate-based brine containing monovalent and/or polyvalent cations, aqueous solutions, non-aqueous solutions, base oils, and any combination thereof. Examples of chloride-based brines comprise sodium chloride and calcium chloride. Examples of bromide-based brines comprise sodium bromide, calcium bromide, and zinc bromide. Examples of formate-based brines comprise sodium formate, potassium formate, and cesium formate. To those of ordinary skill in the art, one or more types of wellbore servicing fluid 124 may be referred to as a "pill" or "spacer."

Wellbore servicing fluid 124 may be conveyed or otherwise introduced into the wellbore 118 at predetermined intervals of time in order to, among other things, clean up the wellbore 118 and remove one or more gelled fluids 146 from the wellbore 118. For example, in a displacement operation, the wellbore servicing fluid 124 may be circulated through the wellbore 118 along one or more fluid flow paths 119 in order to mechanically or chemically remove one or more gelled fluids 146 from the wellbore 118. In one or more embodiments, for instance, the wellbore servicing fluid 124 may be circulated through the wellbore 118 at the end of a drilling operation in order to perform a displacement operation in preparation for hydrocarbon production. As the wellbore servicing fluid 124 contacts the gelled fluids 146 built up in the wellbore 118, in one or more embodiments, the gelled fluids 146 may be solubilized, dissolved or otherwise mechanically eroded from the wellbore 118.

In one or more embodiments, upon returning to the surface and exiting the wellbore 118, the wellbore servicing fluid 124 may be conveyed to one or more servicing fluid reclamation equipment 132 fluidly coupled to the annulus 128. The reclamation equipment 132 may be configured to receive and rehabilitate the wellbore servicing fluid 124 in preparation for its reintroduction into the wellbore 118, if desired. The reclamation equipment 132 may comprise one or more filters or separation devices configured to clean the wellbore servicing fluid 124. In at least one embodiment, the reclamation equipment 132 may comprise a diatomaceous earth filter, or the like.

In one or more embodiments, wellbore servicing system 100 comprises one or more instrument trucks 136, one or more pump trucks 138, and a wellbore servicing fluid control subsystem 131. The wellbore servicing system 100 may perform one or more displacement operations that comprise, for example, a multi-stage displacement operation, a single-stage displacement operation, a final displacement operation, other types of displacement operations, and a combination thereof. For example, a displacement operation may circulate one or more wellbore servicing fluids 124 (for example, one or more pills, one or more spacers, and any combination thereof) over a single time period or multiple time periods. The circulation of a plurality of wellbore servicing fluids 124 in sequential order forms a "displacement train." Moreover, the wellbore servicing system 100 can circulate fluid through any suitable type of wellbore, such as, for example, vertical wellbores, slant wellbores, horizontal wellbores, curved wellbores, or combinations of these and others.

The one or more pump trucks 138 may comprise any one or more of one or more mobile vehicles, one or more immobile installations, one or more skids, one or more hoses, one or more tubes, one or more fluid tanks, one or more fluid reservoirs, one or more pumps, one or more valves, one or more mixers, or any other one or more types of structures and equipment. The one or more pump trucks 138 shown in FIG. 1 can supply wellbore servicing fluid 124 or other materials for the displacement operation. The one or more pump trucks 138 may convey the wellbore servicing fluid 124 downhole through the interior conduit 109 defined in the drill string 108 and through one or more orifices in the drill bit 116.

The one or more instrument trucks 136 may comprise mobile vehicles, immobile installations, or other structures. The one or more instrument trucks 136 shown in FIG. 1 comprise a wellbore servicing fluid control subsystem 131 that controls or monitors the displacement operation applied by the wellbore servicing system 100. One or more communication links 142 may communicatively couple the one or more instrument trucks 136 to the one or more pump trucks 138, or other equipment at a ground surface 140. In one or more embodiments, the one or more communication links 142 may communicatively couple the one or more instrument trucks 136 to one or more controllers 144 disposed at or about the wellbore, one or more sensors (such as surface sensors 150 and downhole sensors 152), other one or more data collection apparatus in the wellbore servicing system 100, remote systems, other well systems, any equipment installed in the wellbore 118, other devices and equipment, and a combination thereof. In one or more embodiments, the one or more communication links communicatively couple the one or more instrument trucks 136 to the wellbore monitoring system 110, which may run simulations and record simulation data. The wellbore servicing system 100 may comprise a plurality of uncoupled communication links 142 or a network of coupled communication links 142. The communication links 142 may comprise direct or indirect, wired or wireless communications systems, or combinations thereof.

The wellbore servicing system 100 may also comprise one or more surface sensors 150 and one or more downhole sensors 152 to measure a pressure, a rate, a temperature, and any other parameters of displacement operations. For example, the surface sensors 150 and downhole sensors 152 may comprise meters or other equipment that measure properties of one or more fluids in the wellbore 118 at or near the ground surface 140 level or at other locations. The wellbore servicing system 100 may comprise one or more pump controls 123 or other types of controls for starting, stopping, increasing, decreasing or otherwise controlling pumping as well as controls for selecting or otherwise controlling fluids pumped during the displacement operation. The wellbore servicing fluid control subsystem 131 may communicate with the one or more of one or more surface sensors 150, one or more downhole sensors 152, one or more pump controls 123, and other equipment to monitor and control the displacement operation.

The wellbore monitoring system 110 may comprise one or more information handling systems (such as the information handling system represented in FIG. 2) located at the wellbore 118 or any one or more other locations. The wellbore monitoring system 110 or any one or more components of the wellbore monitoring system 110 may be located remote from any one or more of the other components shown in FIG. 1. For example, the wellbore monitoring system 110 may be located at a data processing center, a computing facility, or another suitable location. The wellbore servicing system 100 may comprise additional or different features, and the features of the wellbore servicing system 100 may be arranged as shown in FIG. 1 or in another configuration.

In one or more embodiments, the wellbore servicing fluid control subsystem 131 shown in FIG. 1 controls operation of the wellbore servicing system 100. The wellbore servicing fluid control subsystem 131 may comprise one or more data processing equipment, one or more communication equipment, or other systems that control the circulation of wellbore servicing fluids through the wellbore 118. The wellbore servicing fluid control subsystem 131 may be communicatively linked or communicatively coupled to the wellbore monitoring system 110, which may calculate, select, or optimize displacement operation parameters. The wellbore servicing fluid control subsystem 131 may receive, generate or modify a displacement operation plan (for example, a pumping schedule or displacement train) that specifies parameters of a displacement operation to be applied to the wellbore 118.

In one or more embodiments, the wellbore monitoring system 110 may simulate wellbore hydraulics in the wellbore servicing system 100. For example, the wellbore monitoring system 110 may comprise one or more flow models for simulating fluid flow in or between various locations of fluid flow in the well system, such as, for example, the wellbore 118, the drill string 108, any other components, and any combination thereof. The one or more flow models may also model the flow of miscible fluids, immiscible fluids, or composite fluids comprised of a plurality of fluids. In one or more embodiments, the one or more flow models may model flow in one, two, or three spatial dimensions. The one or more flow models may comprise nonlinear systems of differential or partial differential equations. The wellbore monitoring system 110 may generate a plurality of nodes or a mesh for use in the one or more flow models or simulations. The wellbore monitoring system 110 can use the flow models to predict, describe, or otherwise analyze the dynamic behavior of fluid in the wellbore servicing system 100.

The wellbore monitoring system 110 may perform one or more simulations before, during, or after the displacement operation. In one or more embodiments, the wellbore servicing fluid control subsystem 131 controls the displacement operation based on one or more simulations performed by the wellbore monitoring system 110. For example, a pumping schedule or one or more other aspects of the displacement operation may be generated in advance based on one or more simulations performed by the wellbore monitoring system 110. As another example, the wellbore servicing fluid control subsystem 131 may modify, update, or generate a displacement operation based on simulations performed by the wellbore monitoring system 110 in real time during the displacement operation.

In one or more embodiments, the one or more simulations are based on data obtained from the wellbore servicing system 100. For example, one or more pressure meters, one or more flow monitors, one or more microseismic equipment, one or more tiltmeters, or other equipment can perform measurements before, during, or after a displacement operation; and the wellbore monitoring system 110 may simulate wellbore hydraulics based on the measured data. In one or more embodiments, the wellbore servicing fluid control subsystem 131 may select or modify (for example, increase or decrease) one or more pressures of the wellbore servicing fluid 124, one or more densities of the wellbore servicing fluid, one or more viscosities of the wellbore servicing fluid, one or more compositions of the wellbore servicing fluid, and one or more other control parameters based on data provided by the one or more simulations. In one or more embodiments, data provided by the one or more simulations may be displayed in real time during the displacement operation, for example, to an engineer or other operator of the wellbore servicing system 100.

In one or more embodiments, the techniques and operations described herein may be implemented by one or more information handling systems configured to provide the functionality described. In various instances, a computing system may comprise any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 2:
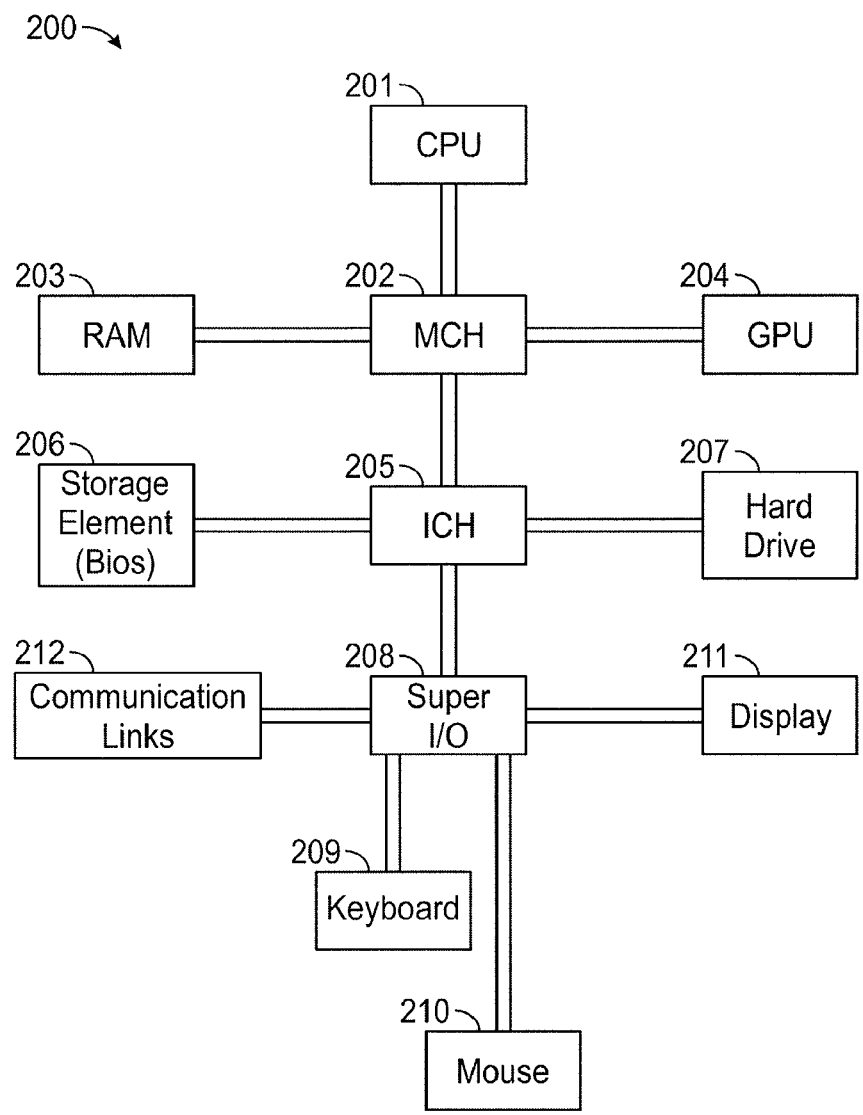
FIG. 2 is a diagram illustrating an information handling system, according to one or more aspects of the present disclosure.

FIG. 2 is a diagram illustrating an example information handling system 200, according to one or more aspects of the present disclosure. The wellbore monitoring system 110 in FIG. 2 may take a form similar to the information handling system 200 or include one or more components of information handling system 200. A processor or central processing unit (CPU) 201 of the information handling system 200 is communicatively coupled to a memory controller hub (MCH) or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 203, for example, a non-transitory memory, for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit (GPU) 204. Memory controller hub 202 may also be coupled to an I/O controller hub (ICH) or south bridge 205. I/O controller hub 205 is coupled to storage elements of the information handling system 200, including a storage element 206, which may comprise a flash ROM that includes a basic input/output system (BIOS) of the computer system. I/O controller hub 205 is also coupled to the hard drive 207 of the information handling system 200. I/O controller hub 205 may also be coupled to a Super I/O chip 208, which is itself coupled to several of the I/O ports of the computer system, including keyboard 209, mouse 210, and display 211.

In one or more embodiments, the wellbore monitoring system 110 may comprise an information handling system 200 with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 3:
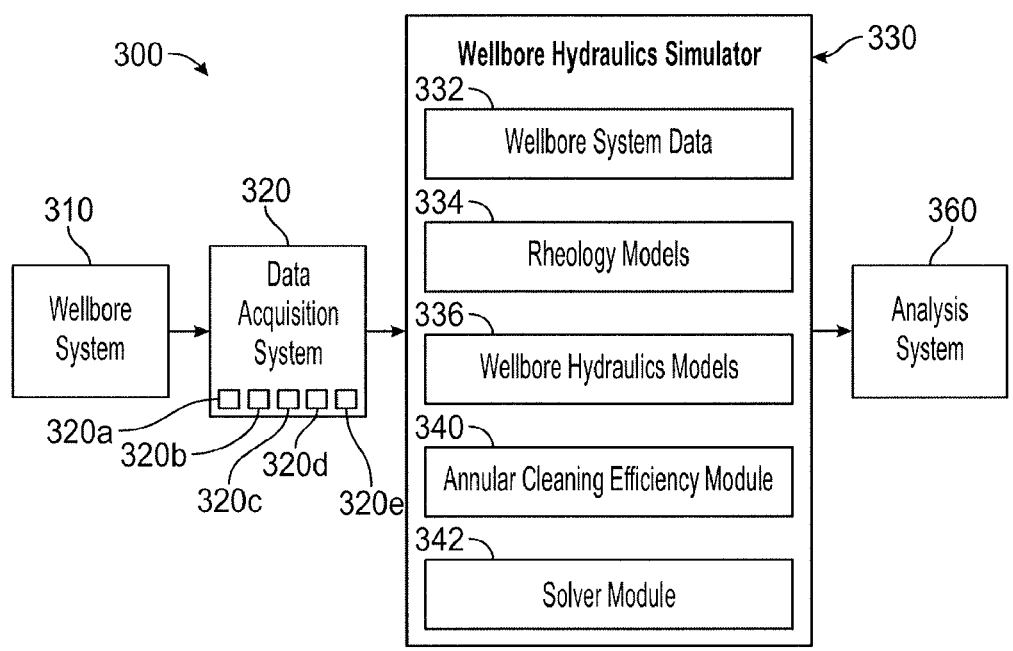
FIG. 3 is a diagram of a wellbore analysis system, according to one or more aspects of the present disclosure.

FIG. 3 is a diagram of wellbore analysis system 300. The wellbore analysis system 300 may be used to model physical phenomena related to a wellbore. For example, the architecture 300 may be used to model one or more fluid flow paths 119 for wellbore 118 as shown in FIG. 1. In one or more embodiments, wellbore analysis system 300 may comprise an information handling system 200 of FIG. 2. In one or more embodiments, the wellbore analysis system 300 models one or more fluid flow paths, one or more other aspects of a displacement operation, one or more other operations or activities, and any combination thereof. In one or more embodiments, the wellbore analysis system 300 models wellbore hydraulics associated with one or more components or elements of, for example, a wellbore servicing system 200. For example, the one or more components or elements may comprise any one or more of wellbores 118, wellbore conduits, wellbore perforations, reservoir rock media, reservoir fractures (for example, one or more fractures in a fracture network, in a dominant bi-wing fracture extending from a wellbore, in a natural complex fracture network, in hydraulically-induced fractures, and any combination thereof), or combinations of these and other types of fluid flow paths in a wellbore. The one or more components or elements may also comprise, for example, one or more properties of an accreted material in the wellbore (for example, gelled fluids 146 in FIG. 1). In one or more embodiments, the wellbore hydraulics may be modelled within, between or both of any of the one or more components or elements.

The wellbore analysis system 300 shown in FIG. 3 comprises a wellbore system 310, a data acquisition system 320, a wellbore hydraulics simulator 330, and an analysis system 360. The wellbore analysis system 300 may comprise additional or different components or subsystems, and the example components shown in FIG. 3 may be combined, integrated, divided, or configured in another manner. For example, the wellbore hydraulics simulator 330 and the analysis system 360 may be subcomponents of an integrated computing system (for example, the wellbore monitoring system 110 shown in FIG. 1) or a plurality of information handling systems; or the data acquisition system 320 can be integrated with the wellbore system 310. In one or more embodiments, the fluid flow simulation system 330 or the analysis system 360, or both, may be implemented in an information handling system (for example, information handling system 200 of FIG. 2) that operates independent of the wellbore system 310 or the data acquisition system 320.

In one or more embodiments, the wellbore system 310 may comprise any physical system where fluid flow or other fluid phenomena occur. The wellbore system 310 may be, for example, the wellbore 118 shown in FIG. 1, or a subset of wellbore servicing system 100 components or subsystems (for example, the wellbore 118 shown in FIG. 1). The wellbore system 310 may comprise the physical reservoir rock in a subterranean reservoir (for example, the subterranean region 120 shown in FIG. 1), one or more fractures or a fracture network in the reservoir rock, one or more downhole systems installed in a wellbore, and a combination thereof.

The data acquisition system 320 may comprise one or more systems or hardware that obtain data from the wellbore system 310. For example, the data acquisition system 320 may comprise one or more flow sensors 320a, one or more pressure sensors 320b, one or more temperature sensors 320c, any other types of measurement devices, and any combination thereof. The data acquisition system 320 may comprise one or more communication systems 320d and one or more data storage systems 320e that store, transfer, manipulate, or otherwise manage the information obtained from the wellbore system 310.

The wellbore hydraulics simulator 330 may comprise one or more information handling systems or computer-implemented programs that simulate fluid flow paths 119 in the wellbore 118, for example, information handling system 200 of FIG. 2. The wellbore hydraulics simulator 330 may receive information related to the wellbore system 310 and simulate fluid flow and other fluid phenomena that occur in the wellbore system 310 based, at least in part, on the received information. For example, the wellbore hydraulics simulator 330 may calculate or determine one or more flow velocities, one or more pressures, one or more fluid concentrations, any other aspects of fluid flow based on information from the data acquisition system 320 or another source and any combination thereof.

In one or more embodiments, the wellbore hydraulics simulator 330 comprises wellbore system data 332, one or more rheology models 334, one or more wellbore hydraulics models 336, an annular cleaning efficiency module 340, and a solver module 342. The wellbore hydraulics simulator 330 may comprise additional or different features, and the features of a wellbore hydraulics simulator 330 may be configured to operate in another manner. The modules of the wellbore hydraulics simulator 330 (for example, annular cleaning efficiency module 340, solver 342, or others) may comprise one or more hardware modules, one or more software modules, any one or more other types of modules and any combination thereof. In one or more embodiments, the modules 332, 334, 336, 340 and 342 may be integrated with each other or with other system components. In one or more embodiments, the wellbore hydraulics simulator 330 may be implemented as software or an application comprising one or more instructions stored in a memory and executed by a processor of an information handling system, for example, information handling system 200 of FIG. 2, and the one or more models and modules 332, 334, 336, 340 and 342 of the wellbore hydraulics simulator 330 may be implemented as software functions or routines that are executed by the information handling system.

The wellbore system data 332 may comprise any information related to the wellbore system 310, any wellbore servicing fluids 124 within the wellbore system 310, any other fluids, or any combination thereof. For example, the wellbore system data 332 may be indicative of one or more physical properties (for example, a geometry, one or more cross-sectional areas, one or more surface properties, any other physical property, and any other combination thereof) associated with the wellbore system 310, one or more rheological properties of the gelled fluids 146 along the wellbore 118 (for example, a static gel strength at surface conditions, one or more shear stresses, one or more normal stresses, one or more oscillatory stresses, one or more shear moduli, one or more pressure while drilling readings, other rheological properties, or any combination thereof), data indicating one or more histories of the gelled fluids (for example, a static time, a shear history, or other data), one or more thermodynamic data (for example, one or more fluid pressures, one or more fluid temperatures, one or more fluid flow rates, or other data) measured at one or more locations in the wellbore system 310, other types of information, and a combination thereof. The wellbore system data 332 may comprise information received from the data acquisition system 320, one or more other sources or both.

The one or more rheology models 334 may comprise any information or one or more modules that may be used to correlate one or more properties of the one or more gelled fluids 146 at respective one or more surface conditions to one or more properties of the one or more gelled fluids at respective one or more downhole conditions. In one or more embodiments, the one or more rheology models 334 are used to apply one or more rheology correction models, wherein the rheology correction models are used to apply a correction to a known value for one or more properties of the one or more gelled fluids, based on one or more downhole conditions. For instance, the one or more rheology models 334 may comprise one or more empirical models to extrapolate or interpolate one or more properties of the gelled fluids at one or more respective downhole conditions based on one or more known values of one or more properties measured at one or more existing data boundaries. In one or more embodiments, one or more rheology models 334 may comprise any information related to the properties of the one or more gelled fluids at one or more conditions (for example, one or more shear rates during a displacement operation, one or more gel strengths, a chemical composition of the gelled fluids, any other one or more conditions, and any combination thereof). For instance, rheology models 334 may comprise models for predicting for a density, a gel strength, another property of one or more gelled fluids, and a combination thereof.

The one or more wellbore hydraulics models 336 may comprise any one or more information or modules that may be used to simulate one or more downhole conditions of the wellbore system 310. The one or more downhole conditions may comprise one or more temperature profiles, one or more pressure profiles, one or more characteristics of non-Newtonian flow fields, other conditions, and any combination thereof. The one or more wellbore hydraulics models 336 can include one or more governing equations, one or more spatial and temporal discretization data, any other information and any combination thereof. In one or more embodiments, the one or more wellbore hydraulics models 336 comprise one or more governing flow equations, such as, for example, the Navier-Stokes equations or one or more related approximations of the Navier-Stokes equations, one or more diffusion-convection equations, one or more conservation equations, one or more continuity equations, any other types of flow equations, and any combination thereof.

As shown in FIG. 3, the wellbore hydraulics simulator 330 may comprise an annular cleaning efficiency module 340. The annular cleaning efficiency module 340 may comprise any information or modules that may be used to measure the efficiency of removing gelled fluids from the wellbore, for instance, during a displacement operation. In one or more embodiments, the annular cleaning efficiency module 340 generates a parameter that is indicative of the proportion of the wellbore walls from which one or more gelled fluids, for example, one or more gelled fluids 146, have been removed, as discussed below with respect to FIG. 6.

The solver module 342 may comprise any information or one or more modules that may be used to solve a system of equations. For example, the solver module 342 may be a direct solver or another type of solver. In one or more embodiments, the solver module 342 receives one or more inputs from one or more other components of the wellbore hydraulics simulator 330. For example, the one or more inputs may comprise an information from any one or more of the wellbore system data 332, the one or more wellbore hydraulics models 336, the annular cleaning efficiency module 340, any other information, and any combination thereof. The one or more inputs may comprise data generated or reported from a separate simulation or model. The solver module 342 may generate a numerical result for a variable of interest based on the one or more inputs. The result may be generated for one or more of the grid points in a discretized spatial domain. For example, the solver module 342 may calculate a value of one or more fluid velocities, one or more fluid pressures, one or more fluid concentrations, or other variables over a spatial domain; the values may be calculated for an individual time step or a plurality of time steps.

The analysis system 360 may comprise any one or more of one or more systems, one or more components, one or more modules and any combination thereof that analyze, process, use, or access the simulation data generated by the wellbore hydraulics simulator 330. For example, the analysis system 360 may be a real time analysis system that displays or otherwise presents wellbore data (such as, displaying on a display 211) to a field engineer, an operator, any other personnel and any combination thereof) during a wellbore servicing treatment. In one or more embodiments, the analysis system 360 may comprise any other one or more simulators, a simulation manager or both that use the hydraulics simulation data to simulate other aspects of a wellbore. For example, the analysis system 360 may be a displacement operation simulation suite of one or more applications that simulates the amount or quantity of the one or more gelled fluids 146 in a wellbore 118 removed by a particular wellbore servicing fluid 124, based on simulated wellbore hydraulics data generated by the wellbore hydraulics simulator 330.

Figure 4:
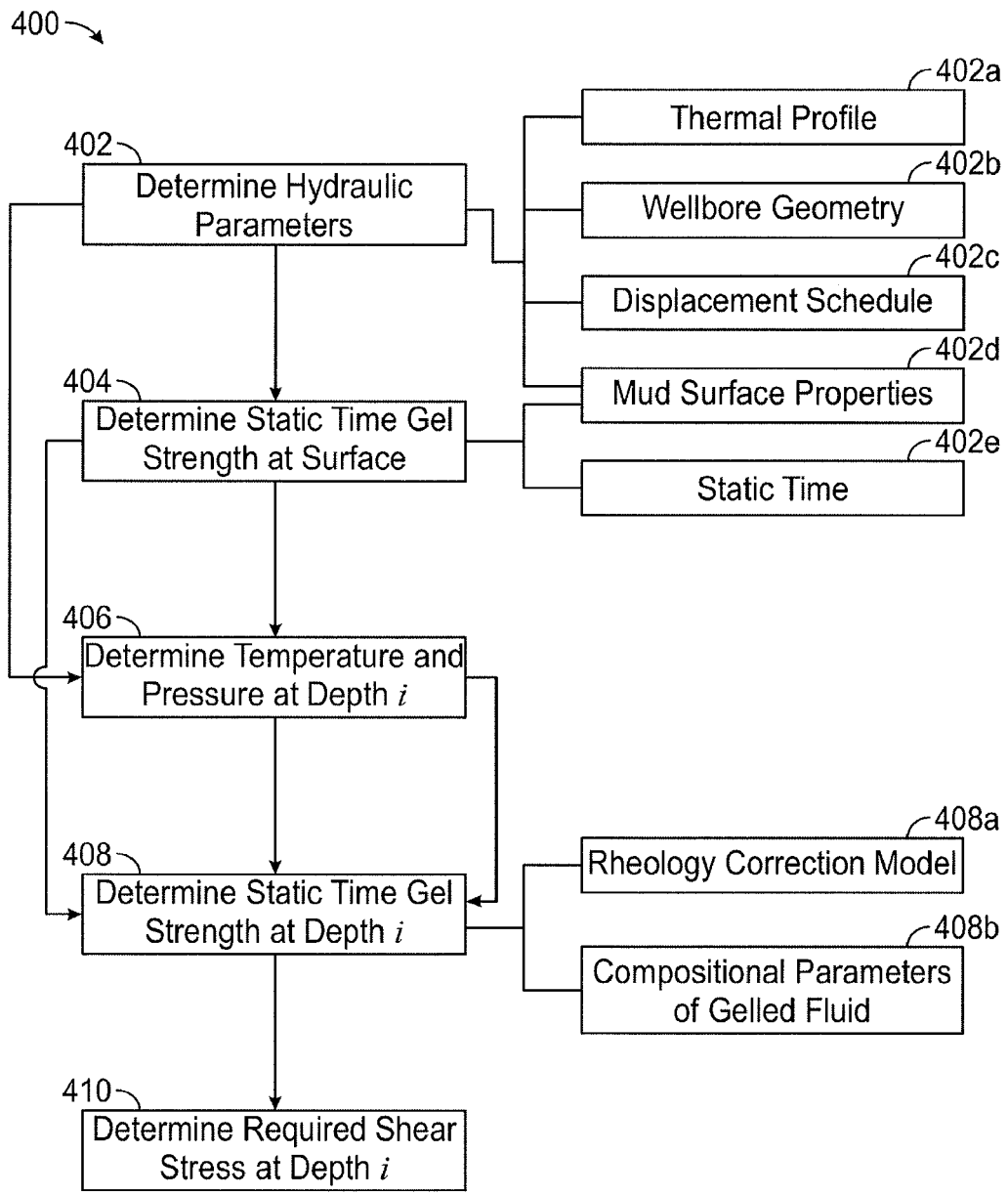
FIG. 4 is a flow chart for determining a required shear stress profile for the gelled fluid throughout the wellbore, according to one or more aspects of the present disclosure.

FIG. 4 is an example flow chart 400 used to determine the required shear stress to remove a gelled fluid from a section of a wellbore at one or more downhole conditions, for example, gelled fluid 146 and wellbore 118 of FIG. 1. In one or more embodiments, an information handling system 200, for example, wellbore monitoring system 110 shown in FIG. 1, may implement any one or more steps of process 400. The process 400, one or more individual operations of the process 400, or groups of operations may be iterated or performed in parallel, in series, or in another manner. In one or more embodiments, the process 400 may comprise the same, additional, fewer, or different operations performed in the same or a different order.

In one or more embodiments, process 400 determines the required shear stress to remove the gelled fluid 146 based, at least in part, on a history of one or more characteristics of the gelled fluid. The one or more characteristics of the gelled fluid may comprise an overall static time elapsed, a downhole temperature, a downhole pressure, other characteristics, and a combination thereof. The required shear stress may be determined based, at least in part, on one or more of one or more governing equations, one or more empirical models, one or more associated variables, and a combination thereof. In one or more embodiments, process 400 may be repeated at one or more predetermined or selected depths of the wellbore 118 to determine a required shear stress profile.

At 402, one or more hydraulic parameters of the wellbore servicing system 100 are determined. The one or more hydraulic parameters may comprise one or more properties of the wellbore servicing system 100 and one or more fluids associated with the wellbore servicing system 100, such as a thermal profile 402a, a wellbore geometry 402b, a displacement schedule 402c, one or more mud surface properties 402d, any other parameters that define hydraulic flow in the wellbore 118, and a combination thereof. The hydraulic parameters may comprise one or more characteristics of the one or more wellbore servicing fluids 124 in the displacement schedule such as a fluid type, a fluid composition, any other one or more mechanical properties, other fluid characteristics, and a combination thereof.

At 404, a surface static time gel strength (SSTG) is determined for the gelled fluid 146 at ground surface 140 of FIG. 1. The surface static time gel strength may be extrapolated or interpolated by obtaining a plurality of measurements for gel strength at the ground surface 140. In one or more embodiments, the static time gel strength may also be determined by interpolating or extrapolating mud surface properties 402d by using empirical models. In one or more embodiments, the surface static time gel strength may be extrapolated, as shown below in Equation (1), as a function of static time 402e and one or more measurements for the gel strength as the gel strength is increasing (for example, after 10 seconds, 10 minutes, 30 minutes, and any other time).

$$\text{SSTG} = f(\text{static time, gel strength } 10s, \text{ gel strength } 10 \text{ min, gel strength } 30 \text{ min}) \quad \text{Equation (1)}$$

At 406, a downhole temperature and a downhole pressure are determined for a fixed depth i in the wellbore. Step 406 uses as inputs the hydraulic parameters and the static time gel strength obtained from steps 402 and 404. In some embodiments, wellbore hydraulics simulator 330 may be used to calculate the downhole temperature and the downhole pressure. The downhole temperature and downhole pressure may be calculated based on one or more empirical equations, one or more discretized governing thermodynamic equations, other equations, and any combination thereof. In one or more embodiments, the equations are solved numerically, for example, using an iterative method such as Newton's method.

At 408, a downhole static time gel strength (DSTG) is determined based, at least in part, on the surface static time gel strength (as determined by step 404) and the temperature and the pressure at fixed depth i (as determined by step 406). For example, a rheology correction model 408a may be used to obtain a corrected downhole static time gel strength for fixed depth i by applying one or more empirical correlations that relate the surface static time gel strength to one or more downhole temperatures and one or more downhole pressures. The rheology correction model 408a may account for one or more compositional parameters of the gelled fluid (408b), such as a one or more shear rates during a displacement operation, one or more gel strengths, a chemical composition of the gelled fluid, other parameters, and any combination thereof. Example Equation (2) demonstrates the inputs used to determine downhole static time gel strength at any fixed depth i. In equation (2), $T_i$ and $P_i$ are the temperature and pressure at fixed depth i of the wellbore obtained from step 406.

$$DSTG_i = f(T_i, P_i, SSTG) \qquad \text{Equation (2)}$$

At 410, the required shear stress to remove the gelled fluid 146 from the wellbore 118 at fixed depth i is determined using the $DSTG_i$ obtained from step 408. An actual shear stress generated by wellbore servicing fluid 124 at the wall of the wellbore must be greater than the downhole static time gel strength to remove the gelled fluid 146. In one or more embodiments, the determined required shear stress, $RSS_i$, is the downhole static time gel strength, $DSTG_i$, multiplied by an arbitrary factor of safety. As example Equation (3) demonstrates, required shear stress, $RSS_i$, may be determined as a function of the downhole static time gel strength, $DSTG_i$, calculated from step 408.

$$RSS_i = f(DSTG_i) \qquad \text{Equation (3)}$$

Figure 5:
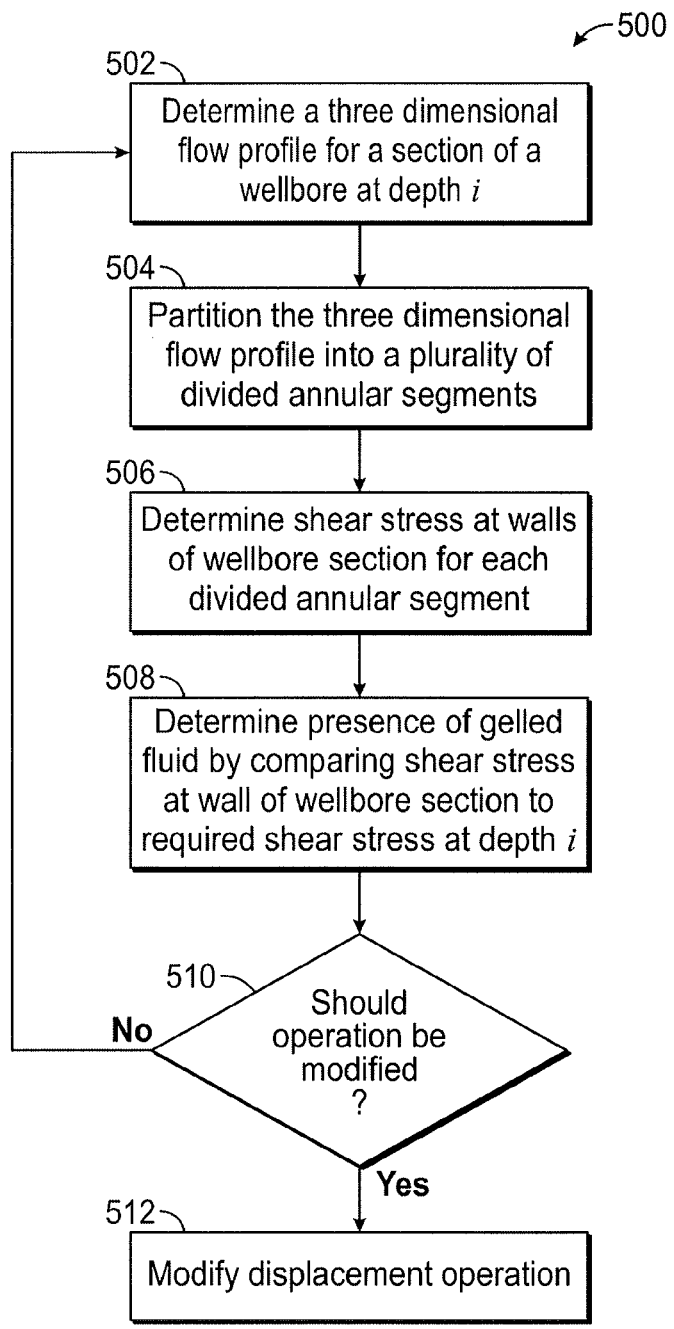
FIG. 5 is a flow chart for modifying a displacement operation, according to one or more aspects of the present disclosure.

FIG. 5 illustrates a process 500 used to determine whether a gelled fluid has been removed from a section of a wellbore for any fixed depth i. In one or more embodiments, the gelled fluid may be gelled fluid 146 and the wellbore may be wellbore 118 in FIG. 1. In one or more embodiments, an information handling system 200, for example, wellbore monitoring system 110 shown in FIG. 2, may implement any one or more steps of process 400. The process 500, one or more individual operations of the process 500, or groups of operations may be iterated or performed in parallel, in series, or in another manner. In one or more embodiments, the process 500 may comprise the same, additional, fewer, or different operations performed in the same or a different order.

At step 502, a three dimensional flow profile is determined for the wellbore servicing fluid 124 flowing through a fluid flow path 119 (for example, a section of a wellbore 118 at depth i). The three dimensional flow profile may comprise, among other things, a velocity profile, a thermal profile, a pressure profile, a shear stress profile, profiles for other fluid properties, and any combination thereof. Methods of obtaining the three dimensional flow profile are known to those of ordinary skill in the art and may comprise methods for both Newtonian and non-Newtonian flow. In one or more embodiments, the three dimensional profile may be determined using governing flow equations, such as, for example, the Navier-Stokes equation, one or more related approximations of the Navier-Stokes equation, one or more diffusion-convection equations, one or more conservation equations, one or more continuity equations, any other one or more equations, and any combination thereof. The three dimensional flow profile may also be determined using one or more analytical models for non-Newtonian flow, such as the Herschel-Bulkley model, Power Law model, Bingham Plastic model, any one or more other analytical models, and any combination thereof. In one or more embodiments, the three dimensional profile may also be determined applying numerical methods, for instance, by solving the Navier-Stokes equations with shear-rate dependent viscosity for non-Newtonian flow.

Figure 6:
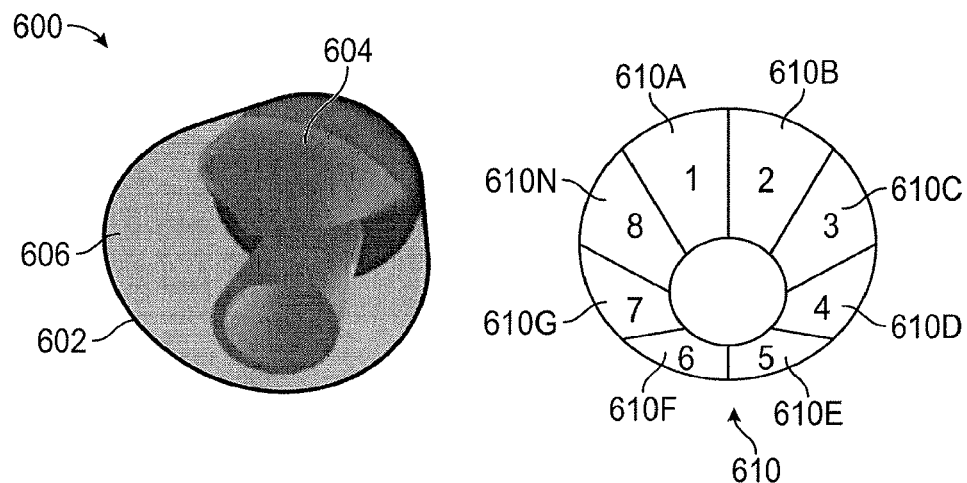
FIG. 6 is a diagram illustrating partitioning an annular wellbore into divided annular segments, according to one or more aspects of the present disclosure.

At step 504, to account for any eccentricity of the wellbore 118, the three dimensional flow profile from step 502 may be partitioned into a plurality of divided annular segments. FIG. 6 illustrates a three dimensional flow profile 604 of a wellbore section 602 that is partitioned by dividing the cross section of the wellbore section 602, according to one or more embodiments of the present disclosure. Applying step 502 results in divided annular segments 610A-610N (collectively, divided annular segments 610), where "N" is any number of divided annular segments 610. Based on the three-dimensional flow profile 604, in one or more embodiments each divided annular segment 610A-610N is treated as a pipe with a hydraulic diameter. Each divided annular segment 610A-610N may also be treated as a pipe with an average velocity calculated from the three dimensional flow profile 604.

At step 506, one or more actual shear stresses at the walls 606 of each divided annular segment 610 are determined by analyzing the portion of three dimensional flow profile 604 that flows through each divided annular segment 610. Actual shear stress is exerted on the walls, for example, during a displacement operation when a wellbore servicing fluid 124 circulates through the wellbore. In one or more embodiments, the wellbore hydraulics simulator 330 from FIG. 3 may be used to calculate the actual shear stresses at the walls during a displacement operation. For example, the actual shear stresses may be obtained using one or more properties of the three dimensional flow profile 604 through the divided annular segment 610, such as a pressure, a length, a density, a hydraulic diameter, a mean flow velocity, a rate, other properties, and a combination thereof.

Step 508 determines the presence of gelled fluid 146 in each divided annular segment 610 by comparing the actual shear stress at the walls 606 of the divided annular segment 610 (from step 506) to a required shear stress at fixed depth i. The required shear stress at fixed depth i is the minimum amount of actual shear stress a wellbore servicing fluid 124 would need to exert on the walls of the wellbore in order to remove a gelled fluid. The required shear stress at fixed depth i may be determined by using process 400. The gelled fluid 146 is determined to be removed from divided annular segment 610 if the actual shear stress at the walls of divided annular segment 610 exceeds or equals the required shear stress at fixed depth i. In one or more embodiments, a parameter for the mechanical cleaning efficiency may be determined from a plurality of comparisons for a plurality of divided annular segments 610, as described with respect to FIG. 7.

At step 510, in one or more embodiments, one or more results from step 508 are used to determine whether to modify or adjust a displacement operation based, at least in part, on one or more factors including, but not limited to, amount of gelled fluid 146 removed from the wellbore. For example, if step 510 determines that the amount of gelled fluid 146 is sufficiently removed from wellbore 118, then the process continues at step 502. The gelled fluid 146 may be considered sufficiently removed when the amount of gelled fluid 146 removed is at or exceeds a removal threshold. In one or more embodiments, the amount of gelled fluid 146 removed is based on the amount of gelled fluid 146 removed over a plurality of intervals of time as wellbore servicing fluid 124 circulates through the wellbore. In one or more embodiments, the wellbore hydraulics simulator 330 from FIG. 3 may be used to calculate the amount of gelled fluid 146 removed over a plurality of intervals of time as wellbore servicing fluids 124 circulated through the wellbore section 602.

At step 512, if a significant amount of gelled fluid 146 remains in the wellbore 118 after the displacement operation, then the displacement operation may be modified to increase the volume of a wellbore servicing fluid 124 that comprises one or more characteristics or properties suitable for removal of gelled fluids 146. For example, the one or more characteristics or properties of the wellbore servicing fluid 124 may comprise a type, a chemistry, a volume, a concentration, any other physical property, any combination thereof. One or more aspects of the displacement operation (including, but not limited to, one or more pump rates, one or more pump schedules, one or more pipe rotations, other aspects, any combination thereof) may also be modified based, at least in part, on the determination in step 508. Iterative methods such as Newton's method or one or more optimization tools such as linear programming can be used to design a cost-effective displacement train. In one or more embodiments, the modification is an automated process accomplished by using wellbore servicing fluid control subsystem 131, which may receive, generate or modify a pumping schedule or a selection of wellbore servicing fluids 124 in a displacement train. The modification may be based on one or more simulations performed by the wellbore monitoring system 110 from FIG. 1 in real time during the displacement operation.

Figure 7:
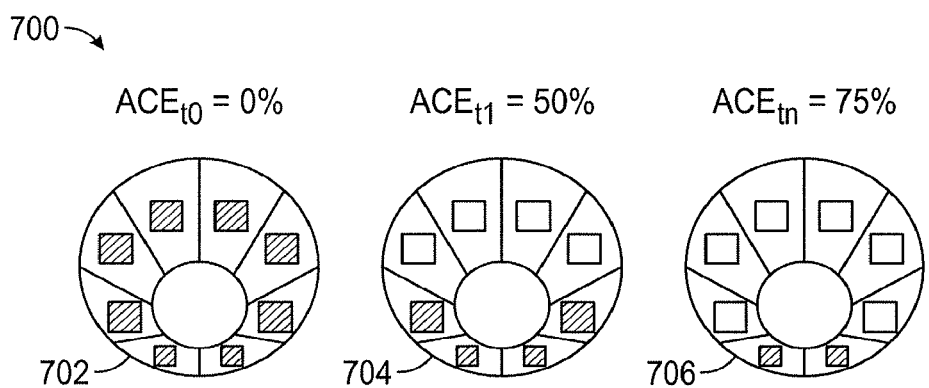
FIG. 7 is a diagram illustrating a time evolution of annular cleaning efficiency in a section of a wellbore, according to one or more aspects of the present disclosure.

FIG. 7 illustrates the process of determining a parameter for the local mechanical cleaning efficiency for a wellbore section 602. In one or more embodiments, the parameter is an annular cleaning efficiency (ACE) as defined by Equation (4) below. In Equation (4), $SA_{removed}$ is the surface area of the wellbore section 602 where gelled fluid 146 has been determined to be removed (for example, by using process 500), total $SA_{wellbore\ section}$ is the total surface area of wellbore section 602 that physically contacts the three dimensional flow profile 604.

$$ACE = \frac{SA_{removed}}{\text{total } SA_{wellbore\ section}} \quad \text{Equation (4)}$$

In one or more embodiments, a plurality of wellbore servicing fluids 124 may flow through the wellbore section 602 during a displacement operation. As the wellbore servicing fluids generate one or more actual shear stresses on the wellbore walls, a transient hydraulics simulation, such as that provided by wellbore hydraulics simulator 330 in FIG. 3, may capture a real time evolution of gelled fluid mechanical removal. In one or more embodiments, the analysis system 360 may track removal of gelled fluids 146 (for example, by measuring annular cleaning efficiency or other parameters that indicate the efficiency of removal) for wellbore section 602. For instance, 702, 704, and 706 illustrate an example of a possible time evolution of ACE for the wellbore section 602.

Similar methodology can be applied to generate a global parameter characterizing a mechanical cleaning efficiency of an entire wellbore 118. The global parameter may be wellbore cleaning efficiency (WCE), which is calculated by using process 400 to generate a required shear stress profile along all depths of a wellbore 118. An actual shear stress profile determined using process 400 is used in process 500 to determine the surface area of gelled fluid 146 removed from wellbore sections 602 along all any one or more depths of the wellbore. Equation (5) demonstrates the calculation for WCE, where $SA_{removed,i}$ is the surface area of the wellbore section 602 where gelled fluid has been determined to be removed (for example, by using process 500) at depth i. A summation for $SA_{removed,i}$ is performed across all j wellbore depths. The resulting summation for the surface area where gelled fluid has been determined to be removed is divided by the total$SA_{wellbore}$, which is the total surface area of wellbore 118 that physically contacts wellbore servicing fluid 124. In one or more embodiments, the analysis system 360 may be used to track a time evolution of the wellbore cleaning efficiency.

$$WCE = \frac{\sum_{i}^{j} SA_{removed,i}}{\text{total } SA_{wellbore}} \quad \text{Equation (5)}$$

In one or more embodiments, a method for removal of accreted materials in a wellbore comprises flowing a wellbore servicing fluid through a fluid flow path of a wellbore, determining a required shear stress to remove the accreted materials from a depth in the wellbore, determining one or more three dimensional flow profiles for the wellbore servicing fluid, dividing the one or more three dimensional flow profiles into a plurality of divided annular segments, and for each of the plurality of divided annular segments, determining an actual shear stress exerted by the wellbore servicing fluid on the walls of the divided annular segment and comparing the actual shear stress to the required shear stress, altering a displacement operation based, at least in part, on the comparison to remove a remaining portion of the accreted materials from the wellbore. In one or more embodiments, the accreted materials comprise one or more gelled fluids. In one or more embodiments, determining the required shear stress comprises determining a downhole static time gel strength at the depth in the wellbore. In one or more embodiments, altering the displacement operation is based, at least in part, on the amount of accreted materials removed over a plurality of intervals of time in the displacement operation. In one or more embodiments, the required shear stress is determined at a plurality of depths in the wellbore. In one or more embodiments, the actual shear stress is compared to the required shear stress at a plurality of depths in the wellbore. In one or more embodiments, the displacement operation is altered based, at least in part, on a parameter for the cleaning efficiency of the displacement operation.

In one or more embodiments, a non-transitory computer-readable medium stores one or more instructions that, when executed by a processor, cause the processor to receive data for a wellbore servicing fluid flowing through a fluid flow path of a wellbore, determine a required shear stress to remove accreted materials from a depth in the wellbore, determine one or more three dimensional flow profiles for the wellbore servicing fluid, divide the one or more three dimensional flow profiles into a plurality of divided annular segments, and for each of the plurality of divided annular segments, determining an actual shear stress exerted by the wellbore servicing fluid on the walls of the divided annular segment and comparing the actual shear stress to the required shear stress, alter a displacement operation based, at least in part, on the comparison. In one or more embodiments, the accreted materials comprise one or more gelled fluids. In one or more embodiments, determining the required shear stress comprises determining a downhole static time gel strength at the depth in the wellbore. In one or more embodiments, altering the displacement operation is based, at least in part, on the amount of accreted materials removed over a plurality of intervals of time in the displacement operation. In one or more embodiments, the displacement operation is altered based, at least in part, on a parameter for the cleaning efficiency of the displacement operation. In one or more embodiments, the required shear stress is determined at a plurality of depths in the wellbore. In one or more embodiments, the actual shear stress is compared to the required shear stress at a plurality of depths in the wellbore.

In one or more embodiments, an information handling system comprises a memory and a processor coupled to the memory, wherein the memory comprises one or more instructions executable by the processor to receive data for a wellbore servicing fluid flowing through a fluid flow path of a wellbore, determine a required shear stress to remove the accreted materials from a depth in the wellbore, determine one or more three dimensional flow profiles for the wellbore servicing fluid, divide the one or more three dimensional flow profiles into a plurality of divided annular segments, and for each of the plurality of divided annular segments, determining an actual shear stress exerted by the wellbore servicing fluid on the walls of the divided annular segment and comparing the actual shear stress to the required shear stress, alter a displacement operation based, at least in part, on the comparison. In one or more embodiments, the accreted materials comprise one or more gelled fluids. In one or more embodiments, determining the required shear stress comprises determining a downhole static time gel strength at the depth in the wellbore. In one or more embodiments, altering the displacement operation is based, at least in part, on the amount of accreted materials removed over a plurality of intervals of time in the displacement operation. In one or more embodiments, the actual shear stress at a plurality of depths in the wellbore is compared to the required shear stress at a plurality of depths in the wellbore. In one or more embodiments, the displacement operation is altered based, at least in part, on a parameter for the cleaning efficiency of the displacement operation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

A number of examples have been described. Nevertheless, it will be understood that various modifications can be made. Accordingly, other implementations are within the scope of the following claims.

What is claimed is:

1. A method for removal of accreted materials in a wellbore comprising:
   flowing a wellbore servicing fluid through a fluid flow path of a wellbore;
   determining a required shear stress to remove the accreted materials from a depth in the wellbore;
   determining one or more three dimensional flow profiles for the wellbore servicing fluid;
   dividing the one or more three dimensional flow profiles into a plurality of divided annular segments; and
   for each of the plurality of divided annular segments:
      determining an actual shear stress exerted by the wellbore servicing fluid on the walls of the divided annular segment; and
      comparing the actual shear stress to the required shear stress;
   altering a displacement operation based, at least in part, on the comparison to remove a remaining portion of the accreted materials from the wellbore.

2. The method of claim 1, wherein the accreted materials comprise one or more gelled fluids.

3. The method of claim 1, wherein determining the required shear stress comprises determining a downhole static time gel strength at the depth in the wellbore.

4. The method of claim 1, wherein altering the displacement operation is based, at least in part, on the amount of accreted materials removed over a plurality of intervals of time in the displacement operation.

5. The method of claim 1, wherein the required shear stress is determined at a plurality of depths in the wellbore.

6. The method of claim 5, wherein the actual shear stress is compared to the required shear stress at the plurality of depths in the wellbore.

7. The method of claim 1, wherein the displacement operation is altered based, at least in part, on a parameter for the cleaning efficiency of the displacement operation.

8. A non-transitory computer-readable medium storing one or more instructions that, when executed by a processor, cause the processor to:
   receive data for a wellbore servicing fluid flowing through a fluid flow path of a wellbore;
   determine a required shear stress to remove accreted materials from a depth in the wellbore;
   determine one or more three dimensional flow profiles for the wellbore servicing fluid;
   divide the one or more three dimensional flow profiles into a plurality of divided annular segments; and
   for each of the plurality of divided annular segments
      determining an actual shear stress exerted by the wellbore servicing fluid on the walls of the divided annular segment; and
      comparing the actual shear stress to the required shear stress;
   alter a displacement operation based, at least in part, on the comparison.

9. The computer readable medium of claim 8, wherein the accreted materials comprise one or more gelled fluids.

10. The computer readable medium of claim 8, wherein determining the required shear stress comprises determining a downhole static time gel strength at the depth in the wellbore.

11. The computer readable medium of claim 8, wherein altering the displacement operation is based, at least in part, on the amount of accreted materials removed over a plurality of intervals of time in the displacement operation.

12. The computer readable medium of claim 8, wherein the displacement operation is altered based, at least in part, on a parameter for the cleaning efficiency of the displacement operation.

13. The computer readable medium of claim 8, wherein the required shear stress is determined at a plurality of depths in the wellbore.

14. The computer readable medium of claim 13, wherein the actual shear stress is compared to the required shear stress at the plurality of depths in the wellbore.

15. An information handling system comprising:
   a memory;
   a processor coupled to the memory, wherein the memory comprises one or more instructions executable by the processor to:

receive data for a wellbore servicing fluid flowing through a fluid flow path of a wellbore;
determine a required shear stress to remove the accreted materials from a depth in the wellbore;
determine one or more three dimensional flow profiles for the wellbore servicing fluid;
divide the one or more three dimensional flow profiles into a plurality of divided annular segments; and
for each of the plurality of divided annular segments
determining an actual shear stress exerted by the wellbore servicing fluid on the walls of the divided annular segment; and
comparing the actual shear stress to the required shear stress;
alter a displacement operation based, at least in part, on the comparison.

16. The information handling system of claim 15, wherein the accreted materials comprise one or more gelled fluids.

17. The information handling system of claim 15, wherein determining the required shear stress comprises determining a downhole static time gel strength at the depth in the wellbore.

18. The information handling system of claim 15, wherein altering the displacement operation is based, at least in part, on the amount of accreted materials removed over a plurality of intervals of time in the displacement operation.

19. The information handling system of claim 15, wherein the actual shear stress at a plurality of depths in the wellbore is compared to the required shear stress at a plurality of depths in the wellbore.

20. The information handling system of claim 15, wherein the displacement operation is altered based, at least in part, on a parameter for the cleaning efficiency of the displacement operation.

* * * * *